(12) United States Patent
Taylor

(10) Patent No.: US 7,835,126 B2
(45) Date of Patent: Nov. 16, 2010

(54) RESETTABLE SHORT-CIRCUIT PROTECTION CIRCUIT

(75) Inventor: John P. Taylor, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 472 days.

(21) Appl. No.: 11/773,188

(22) Filed: Jul. 3, 2007

(65) Prior Publication Data

US 2009/0009919 A1    Jan. 8, 2009

(51) Int. Cl.
*H02H 9/02* (2006.01)
*H02H 3/00* (2006.01)

(52) U.S. Cl. .......................... 361/93.1; 361/78; 361/83; 361/94

(58) Field of Classification Search ................ 361/93.1, 361/78, 83, 94
See application file for complete search history.

(56) References Cited

U.S. PATENT DOCUMENTS

| 4,835,649 | A | 5/1989 | Salerno |
| 5,684,663 | A | 11/1997 | Mitter |
| 6,804,091 | B2 | 10/2004 | Jenkins et al. |
| 2005/0007711 | A1* | 1/2005 | Liu et al. ....................... 361/90 |
| 2005/0077878 | A1 | 4/2005 | Carrier et al. |

FOREIGN PATENT DOCUMENTS

| EP | 0 685 917 | 12/1995 |
| JP | 04 368419 | 12/1992 |
| JP | 2000-312433 | 11/2000 |
| JP | 2006-107119 | 4/2006 |
| WO | WO 03/056684 | 7/2003 |

* cited by examiner

*Primary Examiner*—Jared Fureman
*Assistant Examiner*—Lucy Thomas

(57) ABSTRACT

A resettable short-circuit protection circuit can terminate excessive fault currents automatically and quickly. The short-circuit protection circuit is switchable and has a low input impedance during normal operation so that there is not a significant voltage drop across the switching elements of the protection circuit. The short-circuit protection circuit allows a power source internal to a portable device to be safely connected to an external accessory where there exists the possibility that the connection could be shorted at the time power is first supplied to the external accessory or a short develops afterwards. After terminating a short-circuit condition, the protection circuit may be reset by cycling an enable signal. The fault termination and reset timing may be configured by selection of internal resistance and capacitance values.

17 Claims, 2 Drawing Sheets

RESETTABLE SHORT-CIRCUIT PROTECTION CIRCUIT

FIELD OF INVENTION

The invention generally relates to fault protection devices, and more particularly, to a short-circuit protection circuit for protecting power sourcing equipment.

BACKGROUND

It has become relatively commonplace for portable devices, such as cellular phones, personal digital assistants (PDAs), laptop computers and the like, to supply power to certain external accessories, such as speakers, earphones, pointing devices and the like. The external accessories can present short-circuit conditions when attached to the portable device. In the portable devices, accidental short-circuiting of an external power supply output is a problem. Without short-circuit protection, if a power supply output is accidentally shorted to ground, the output voltage decreases and the output current increases significantly. The increased output current caused by the short circuit may damage the power sourcing device and its internal components.

Short-circuit protection circuits for portable devices are known. However, known short-circuit protection circuits are not completely adequate because they may not be able to terminate some short-circuit conditions quickly enough to prevent damage to the portable power sourcing device. Thus, there is a need for an improved short-circuit protection circuit that is suitable for use with portable devices.

SUMMARY

It is an advantage of the present invention to provide a resettable short-circuit protection circuit that can terminate excessive fault currents automatically and quickly. It is a further advantage of the invention to provide a resettable short-circuit protection circuit that has low impedance during normal operation so that there is not a significant voltage drop across the switching elements of the protection circuit.

In accordance with an aspect of the invention, the short-circuit protection circuit allows a power source internal to a portable device to be safely connected to an external accessory where there exists the possibility that the connection could be shorted at the time power is first supplied to the external accessory or a short develops afterwards. After terminating a short-circuit condition, the protection circuit may be reset by cycling an enable signal.

The invention is not limited to the above advantages and aspects. Other advantages and aspects of the invention will be or will become apparent to one with ordinary skill in the art upon examination of the following figures and detailed description. It is intended that all such advantages and aspects be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
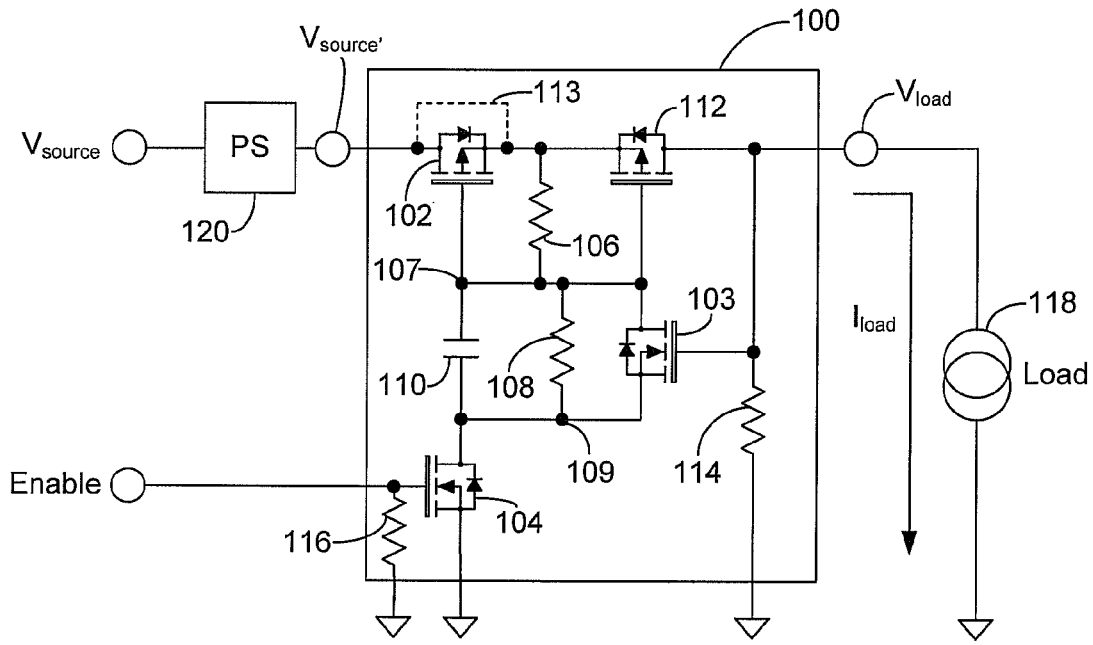
FIG. 1 is a schematic diagram of a short-circuit protection circuit in accordance with an exemplary embodiment of the present invention.

FIG. 1 is a schematic diagram of a short-circuit protection circuit 100 in accordance with an exemplary embodiment of the present invention. The short-circuit protection circuit 100 includes a first p-channel metal-oxide-semiconductor field-effect transistor (MOSFET) 102 having a drain for receiving power from a power supply (PS) 120 and a gate (i.e., a control input) connected to a first node 107. A second p-channel MOSFET (pMOSFET) 112 has a source connected to the source of the first pMOSFET 102, a drain for outputting power to a load 118, and a gate connected to the first node 107. A first n-channel MOSFET (nMOSFET) 103 has its drain connected to the first node 107, a source connected to a second node 109, and a gate connected to the drain of the second pMOSFET 102. A second nMOSFET 104 has its drain connected to the second node 109, a source connected to a ground, and a gate for receiving an enable signal from a means for switching the enable signal, such as a controller.

A first resistor 106 is connected between the sources of the first and second pMOSFETs 102, 112 and the first node 107. A second resistor 108 is connected between the first node 107 and the second node 109. A capacitor 110 is connected between the first node 107 and the second node 109. A third resistor 116 is connected between the gate of the second nMOSFET 104 and the ground. A fourth resistor 114 connected between the gate of the first nMOSFET 103 and the ground.

The first, third and fourth resistors 106, 116, 114 can each have a value of 100K ohms, and the second resistor 108 can have a value of 1 Meg ohms. The capacitor 110 can have a value of 0.1 µF.

The power supply 120 is connected to a power source for supplying power to the first pMOSFET 102. The power supply 120 is any suitable device for supplying a regulated voltage, such a switched-mode power supply (SMPS), including a boost converter. The power source is any suitable means for providing electrical power, such as a battery. The output of the power source can be conditioned by passive elements (not shown) such as one or more inductors, resistors and/or capacitors, and/or active elements, such as one or more diodes, zener diodes and the like, as is known to those skilled in the art. The power source provides power at a source voltage $V_{source}$ to the input of the power supply 120. Internal resistance of the power supply 120 causes a voltage drop proportional to the load current $I_{load}$, and thus, the power supply may output a voltage $V_{source'}$ that is slightly less than the source voltage $V_{source}$.

The load 118 receives load current $I_{load}$ and load voltage $V_{load}$ from the output of the short-circuit protection circuit 100. The load 118 is any electrical device attachable to the output of the protection circuit 100 that can receive power from the protection circuit 100. By way of example, the load 118 can be one or more speakers, a headphone set, microphone, camera, disk drive, memory stick, printer or the like.

The first pMOSFET 102, when off, blocks reverse currents flowing into the protection circuit from the load 118, thus protecting the power supply 120 and power source from the reverse currents. The current blocking is provided by the internal diode of the first pMOSFET 102. The first pMOSFET 102 is optional, and it may be omitted from the circuit 100 entirely, or alternatively, it may be bypassed by short circuit 113 if its reverse blocking functionality is not desired.

The first pMOSFET 102 (when included) and the second pMOSFET 112 provide a low impedance switching path through the protection circuit 100 from $V_{source'}$ to $V_{load}$.

The operation of the protection circuit 100 is now described. Initially, the protection circuit 100 is in an off-state. When the load 118 is connected in a normal state (no short-circuit condition present), the enable is driven high, which turns on nMOSFET 104. The capacitor 110, which was discharged to zero volts during the off-state via the second resistor 108, is pulled down to ground. This pulls the gate(s) of pMOSFET 102, 112 to nearly ground for a period determined by the RC time constant of first resistor 106 and capacitor 110. At this point, the pMOSFETs 102, 112 are enhanced, routing power to $V_{load}$ and to the gate of nMOSFET 103. The nMOSFET 103 is thus enhanced, shorting the capacitor 100 and further enhancing the pMOSFETs 102, 112. This positive feedback continues until the pMOSFETs 102, 112 and the first nMOSFET 103 are maximally enhanced.

If the protection circuit 100 transitions from an off-state to an on-state, and a short-circuit condition initially exists at the load, the above-described operational condition is established, except that the first nMOSFET 103 may not be enhanced due to the short at $VI_{oad}$. Thus, the pMOSFETs 102, 112 turn on momentarily for a period determined by the RC time constant of the first resistor 106 and the capacitor 110, and then turn off.

If a short circuit occurs during a normal on-state, $V_{load}$ is depressed by a value determined by the load current $I_{load}$ and the sum of the supply path resistances: the power supply 120 resistance $Z_{source}$, the channel resistance of the first pMOSFET 102 $R_{dson}$, and the channel resistance of the second pMOSFET 112 $R_{dson}$. At the point that the gate voltage of the first nMOSFET 103 is depressed below its threshold $V_{gsth}$, the first nMOSFET 103 turns off, and subsequently the pMOSFETs 102, 112 turn off in a time determined by the RC time constant of the first resistor 106 and the capacitor 110.

After a short-circuit condition occurs on the load 118, the short-circuit protection circuit 100 is reset by toggling the enable signal for a predetermined period of time based on the RC time constant which is the product of the values of the capacitor 110 and the second resistor 108. When $V_{load}$ has been detected to have been disconnected either at the initial attempt to supply power into an existing load short or due to a temporary short terminating $V_{load}$, the enable signal may be driven low for a period determined by the time constant of the second resistor 108 and the capacitor 110, and then driven high again. This will allow the capacitor 110 to discharge such that the subsequent low-to-high transition on the enable input will cause a "fresh" turn on, as described above for the off-state to on-state transitions.

Figure 2:
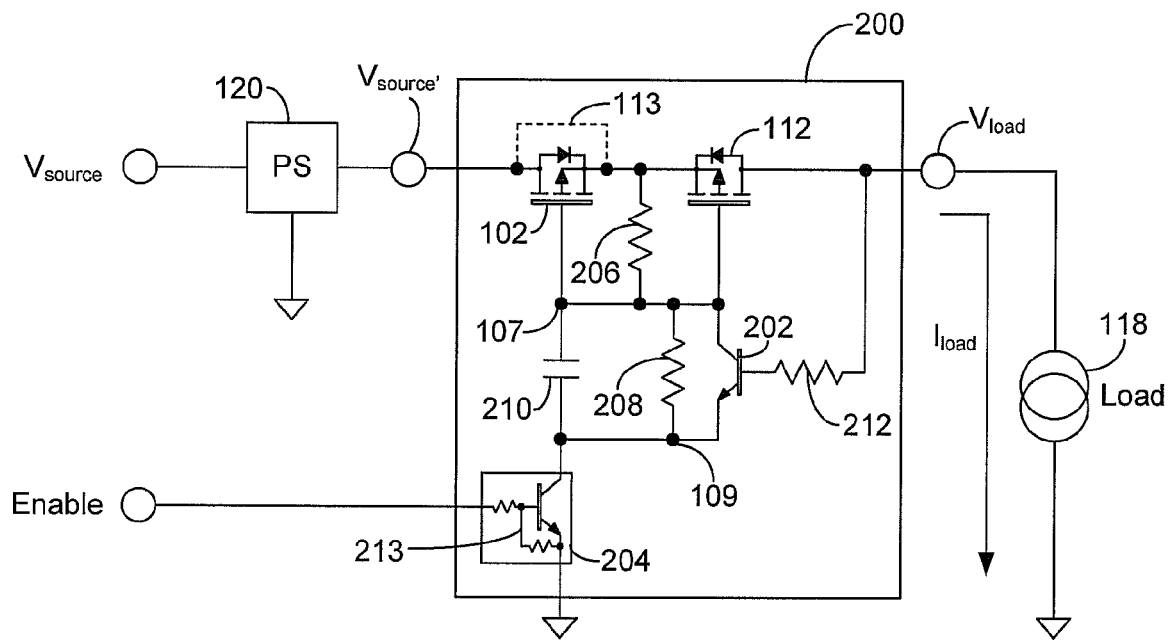
FIG. 2 is a schematic diagram of a short-circuit protection circuit in accordance with another exemplary embodiment of the present invention.

FIG. 2 is a schematic diagram of a short-circuit protection circuit 200 in accordance with another exemplary embodiment of the present invention. The protection circuit 200 of FIG. 2 generally performs in the same manner as the protection circuit 100 of FIG. 1. However, in this embodiment, the protection circuit 200 includes a first NPN bipolar junction transistor (BJT) 202 in place of the first nMOSFET 103 and a second NPN BJT 204 in place of the second nMOSFET 104. The topology of the passive network of the resistors 206, 208 and capacitor 210 is the same as that shown in FIG. 1 for resistors 106, 108 and capacitor 110, but the values of resistors 206, 208 and capacitor 210 are different than their counterparts of FIG. 1 to adjust for the different performance characteristics of the NPN transistors 202, 204. A biasing resistor 212 is connected between the base (i.e., control input) of the first NPN transistor 212 and the drain of the pMOSFET 112. A biasing resistor network 213 is connected between the enable input, base and emitter of the second NPN transistor 204.

The circuits 100, 200 can be implemented using any suitable technology, including discrete components, integrated circuit technology or any combination the foregoing. In an exemplary discrete component implementation, the pMOSFETs 102, 112 can be part no. FDC640P, available from Fairchild Semiconductor Corporation, and the nMOSFETs 103, 104 can be part no. BSS138, also available from Fairchild Semiconductor Corporation.

Although FIGS. 1 and 2 depict the power supply 120 as residing outside of the protection circuits 100, 200, the power supply 120, as well as the power source, can be included within either of the protection circuits 100, 200.

Figure 3:
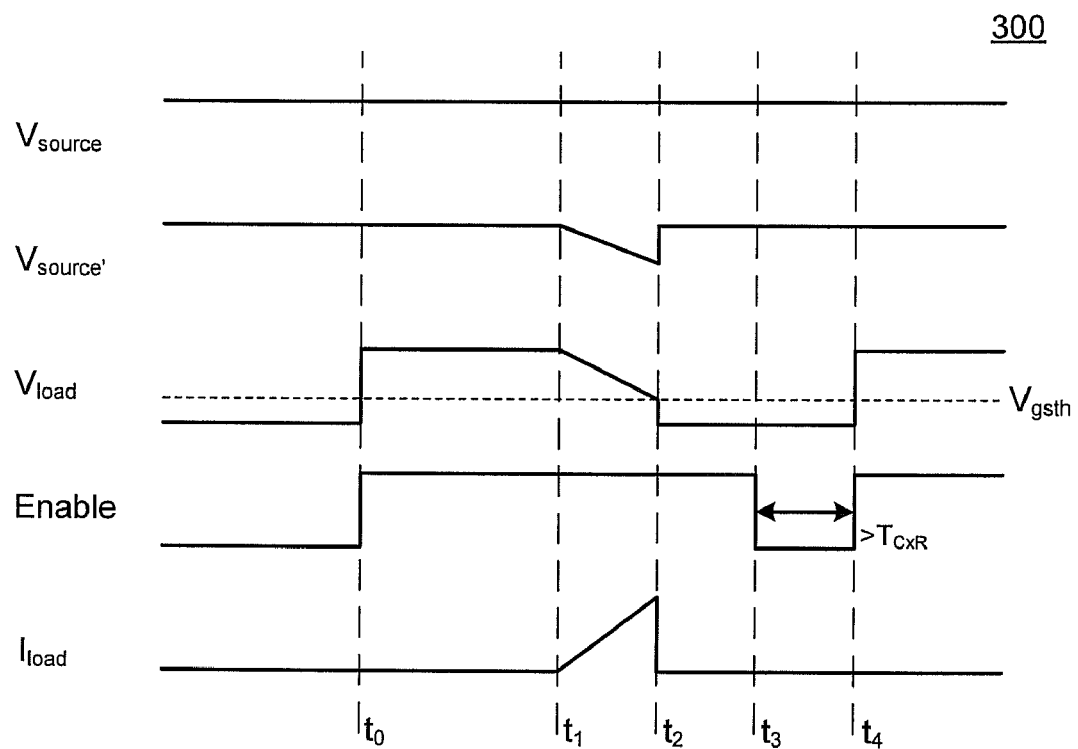
FIG. 3 is a signal trace diagram illustrating exemplary operation of the short-circuit protection circuit of FIG. 1.

FIG. 3 is a signal trace diagram 300 illustrating exemplary operation of the short-circuit protection circuit 100 of FIG. 1. In this operational scenario, a positive source voltage $V_{source}$ is continuously supplied to the input of the power supply 120. The power supply 120 outputs a positive voltage $V_{source'}$, which is slightly less than the source voltage $V_{source}$. At time $t_0$, the enable signal goes high, causing the protection circuit 100 to supply $V_{load}$ at its output to the load 118.

At time $t_1$, the output current $I_{load}$ begins to increase due to a short circuit on the load 118. This causes the supply voltage $V_{source'}$ and output voltage $V_{load}$ to decrease. The load current $I_{load}$ continues to increase during the short-circuit condition until the output voltage $V_{load}$ drops to the gate-source threshold voltage $V_{gsth}$ of the nMOSFET 103 at time $t_2$. At this point, nMOSFET 103 turns off, which turns off the pMOSFETs 102, 112. $I_{load}$ drops to zero, and $V_{source'}$ returns to its normal value.

At time $t_3$, the enable signal is toggled off for a period of time which is at least the RC constant of the second resistor 108 and the capacitor 110. This resets the circuit 100 so that it can continue to supply power to the load 118 after the enable signal returns to high, at time $t_4$.

Figure 4:
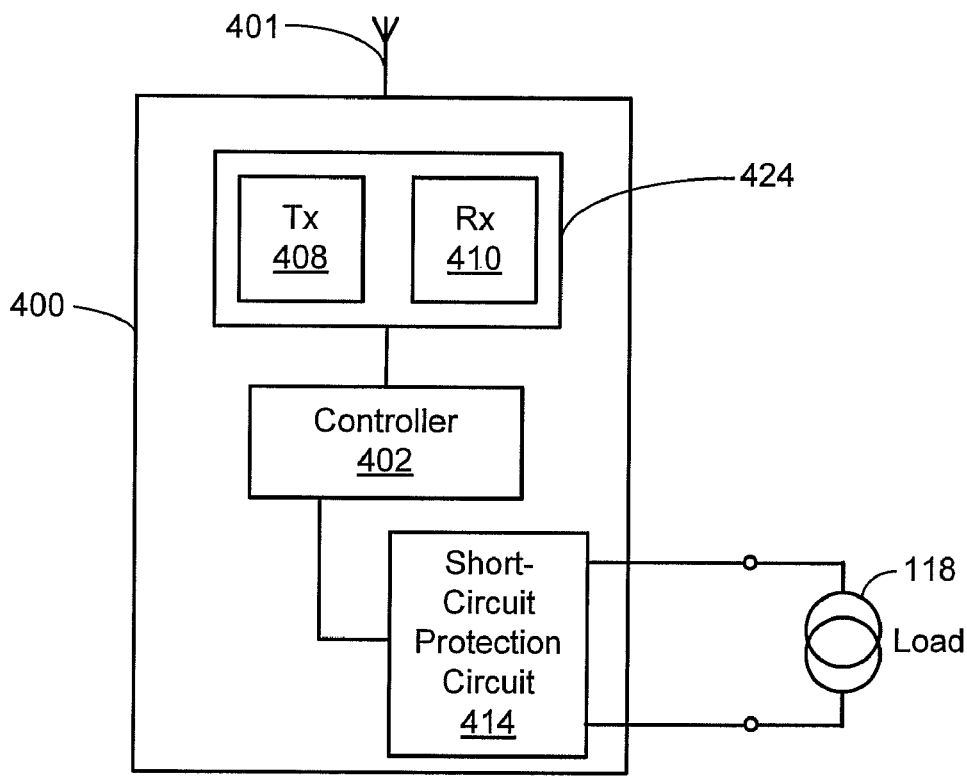
FIG. 4 is a conceptual block diagram of a wireless mobile handset that includes either of the short-circuit protection circuits of FIGS. 1 and 2.

FIG. 4 is a conceptual block diagram of a wireless mobile handset 400 (e.g., a cellular phone, personal digital assistant (PDA) or the like) that includes a short-circuit protection circuit 414, which is either of the short-circuit protection circuits 100, 200 of FIGS. 1 and 2. The wireless mobile handset 400 includes at least one antenna 401, a controller 402 having a processor and memory (not shown) and an air interface with radio frequency transceiver 424 having a transmitter (Tx) 408 and a receiver (Rx) 410. The controller 402 is generally implemented in one or more digital signal processors (DSPs) and/or application specific integrated circuits (ASICs) and includes power management features. The controller memory stores one or more software programs executed by the controller to perform its functions.

The controller 402 includes a signal interface for driving the enable input of the short-circuit protection circuit 414 to selectively enable, disable or reset the protection circuit 414. The controller 402 also includes means for monitoring $V_{load}$ to determine its value. Such means can include an A/D converter. The controller 402 can determine when the enable signal should be toggled in order to reset the protection circuit 414 by periodically comparing measured and expected values $V_{load}$ with the current state of the enable signal.

Other embodiments and modifications of the invention will readily occur to those of ordinary skill in the art in view of the foregoing teachings. Thus, the above summary and detailed description is illustrative and not restrictive. The invention is to be limited only by the following claims, which include all such embodiments and modifications when viewed in conjunction with the above specification and accompanying drawings. The scope of the invention should, therefore, not be limited to the above summary and detailed description, but should instead be determined by the appended claims along with their full scope of equivalents.

What is claimed is:

1. A short-circuit protection circuit, comprising:
   a first transistor having a first terminal for receiving power provided by a power source, a second terminal for outputting power to a load, and a control input;
   a second transistor having a first terminal connected to the control input of the first transistor, a second terminal and a control input connected to the second terminal of the first transistor;
   a third transistor having a first terminal connected to the second terminal of the second transistor, a second terminal connected to a ground, and a control input for receiving an enable signal for resetting the short-circuit protection circuit when toggled for a predetermined period of time after a short-circuit condition occurs on the load;
   a first resistor connected between the first terminal and the control input of the first transistor;
   a second resistor connected between the first and second terminals of the second transistor; and
   a capacitor connected between the first and second terminals of the second transistor, the predetermined period of time based on a time constant based on a resistor value of the second resistor and a capacitor value of the capacitor.

2. The short-circuit protection circuit of claim 1, wherein the power output on the second terminal of the first transistor is cutoff after a control input voltage at the second transistor drops below a control input voltage threshold.

3. The short-circuit protection circuit of claim 1, further comprising:
   a fourth transistor having a first terminal for receiving power from the power supply, a second terminal for outputting the power to the first transistor, and a control input connected to the first terminal of the second transistor.

4. The short-circuit protection circuit of claim 3, wherein fourth transistor is configured to block reverse currents flowing into the protection circuit from the load.

5. The short-circuit protection circuit of claim 1, further comprising:
   a third resistor connected between the control input of the third transistor and the ground.

6. The short-circuit protection circuit of claim 1, further comprising:
   a fourth resistor connected between the control input of the second transistor and the ground.

7. The short-circuit protection circuit of claim 1, further comprising:
   a fourth resistor connected between the control input of the second transistor and the second terminal of the first transistor.

8. The short-circuit protection circuit of claim 1, further comprising:
   a power supply connect to the power source for supplying power to the first terminal of the first transistor.

9. The short-circuit protection circuit of claim 1, wherein the short-circuit protection circuit is included in a wireless mobile handset.

10. The short-circuit protection circuit of claim 1, wherein the first, second and third transistors are MOSFETs, bipolar transistors or any suitable combination of the foregoing transistors.

11. The short-circuit protection circuit of claim 1, means for driving the enable signal to a predetermined value.

12. A short-circuit protection circuit, comprising:
    a first MOSFET having a first terminal for receiving power provided by a power supply, a second terminal for outputting power to a load, and a gate connected to a first node;
    a second MOSFET having a first terminal connected to the first node, a second terminal connected to a second node, and a gate connected to the second terminal of the first MOSFET;
    a third MOSFET having a first terminal connected to the second node, a second terminal connected to a ground, and a gate for receiving an enable signal for resetting the short-circuit protection circuit when toggled for a predetermined period of time after a short-circuit condition occurs on the load;
    a first resistor connected between the first terminal of the first MOSFET and the first node;
    a second resistor connected between the first node and the second node; and
    a capacitor connected between the first node and the second node, the predetermined period of time based on a time constant based on a resistor value of the second resistor and a capacitor value of the capacitor.

13. The short-circuit protection circuit of claim 12, further comprising:
    a fourth MOSFET having a first terminal for receiving power from the power supply, a second terminal connected to the first terminal of the first MOSFET, and a gate connected to the first node.

14. The short-circuit protection circuit of claim 13, wherein fourth MOSFET blocks reverse currents flowing into the short-circuit protection circuit from the load.

15. The short-circuit protection circuit of claim 12, further comprising:
    a third resistor connected between the gate of the third MOSFET and the ground.

16. The short-circuit protection circuit of claim 12, further comprising:
    a fourth resistor connected between the gate of the second MOSFET and the ground.

17. A short-circuit protection circuit, comprising:
    a first p-channel MOSFET having a drain for receiving power from a power supply, a source, and a gate connected to a first node;

a second p-channel MOSFET having a source connected to the source of the first p-channel MOSFET, a drain for outputting power to a load, and a gate connected to the first node;

a first n-channel MOSFET having a drain connected to the first node, a source connected to a second node, and a gate connected to the drain of the second p-channel MOSFET;

a second n-channel MOSFET having a drain connected to the second node, a source connected to a ground, and a gate for receiving an enable signal;

a first resistor connected between the source of the first p-channel MOSFET and the first node;

a second resistor connected between the first node and the second node;

a capacitor connected between the first node and the second node; and means for toggling the enable signal;

wherein after a short-circuit condition occurs on the load, the short-circuit protection circuit is reset by toggling the enable signal for a predetermined period of time based on a time constant which is based on the values of the capacitor and the second resistor.

* * * * *